(12) United States Patent
Underwood et al.

(10) Patent No.: US 8,514,267 B2
(45) Date of Patent: Aug. 20, 2013

(54) METHOD AND SYSTEM FOR ENHANCING STANDARD DEFINITION VIDEO SIGNALS FOR DISPLAY ON A HIGH DEFINITION TELEVISION

(75) Inventors: Rosa M. Underwood, Washington, DC (US); Umang A. Patel, Bellerose, NY (US); Henry A. McKelvey, Capitol Heights, MD (US)

(73) Assignee: Verizon Patent and Licensing Inc, Basking Ridge, NJ (US)

( * ) Notice: Subject to any disclaimer, the term of this patent is extended or adjusted under 35 U.S.C. 154(b) by 996 days.

(21) Appl. No.: 12/177,518

(22) Filed: Jul. 22, 2008

(65) Prior Publication Data

US 2010/0020159 A1 Jan. 28, 2010

(51) Int. Cl.
*H04N 13/00* (2006.01)
(52) U.S. Cl.
USPC .............................. 348/43; 348/253; 348/625
(58) Field of Classification Search
USPC ........................................... 348/43, 253, 625
See application file for complete search history.

(56) References Cited

U.S. PATENT DOCUMENTS

| 5,767,900 A * | 6/1998 | Tanji et al. | 348/253 |
| 2007/0230914 A1* | 10/2007 | Garrido et al. | 386/98 |
| 2008/0288995 A1* | 11/2008 | Diab et al. | 725/118 |

* cited by examiner

*Primary Examiner* — Kyung H Shin (57) ABSTRACT

A system and method in accordance with exemplary embodiments may include receiving, from a video source device, a standard definition video signal, fragmenting the standard definition video signal into at least one of a red representation of the standard definition video signal, a green representation of the standard definition video signal, and a blue representation of the standard definition video signal using one or more 3D converter devices, reconstructing at least one of the red representation of the standard definition video signal, the green representation of the standard definition video signal, and the blue representation of the standard definition video signal using one or more video reconstruction devices, capturing at least one of a reconstructed red representation of the standard definition video signal, a reconstructed green representation of the standard definition video signal, and a reconstructed blue representation of the standard definition video signal using one or more video image capture devices, and outputting, to a high-definition video receiver device, an enhanced standard definition video signal.

20 Claims, 4 Drawing Sheets

METHOD AND SYSTEM FOR ENHANCING STANDARD DEFINITION VIDEO SIGNALS FOR DISPLAY ON A HIGH DEFINITION TELEVISION

BACKGROUND INFORMATION

Standard definition video signals may continue to be the source of video content for many television viewers. With the advent of high definition television technologies, many of these television viewers may switch from using standard television technologies to using high definition television technologies. The display of standard definition video signals on high definition televisions, however, may not be desirable. In many instances, the video images associated with the standard definition video signals that are displayed on the high definition televisions may appear distorted, grainy, and/or ambiguous to the television viewers. For this reason, many television technology providers may continue to search for ways to enhance the standard definition video signals to provide a better television viewing experience for their customers.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

The description below describes elements of a system that may include one or more devices, some of which are explicitly shown in the figures, others that are not. As used herein, the term "device" may be understood to refer to computing software, firmware, hardware, and/or various combinations thereof. It is noted that the devices are exemplary. The devices may be combined, integrated, separated, and/or duplicated to support various applications. Also, a function described herein as being performed at a particular device may be performed at one or more other devices and/or by one or more other devices instead of or in addition to the function performed at the particular device. Further, the devices may be implemented across multiple devices and/or other components local or remote to one another. Additionally, the devices may be moved from one device and added to another device, and/or may be included in both devices.

The description below also describes physical and logical elements of a system, some of which are explicitly shown in figures, others that are not. The inclusion of some physical elements of a system may help illustrate how a given system may be modeled. It should be noted, however, that all illustrations are purely exemplary and that the system described herein may be performed on different varieties of systems which may include different physical and logical elements.

Figure 1:
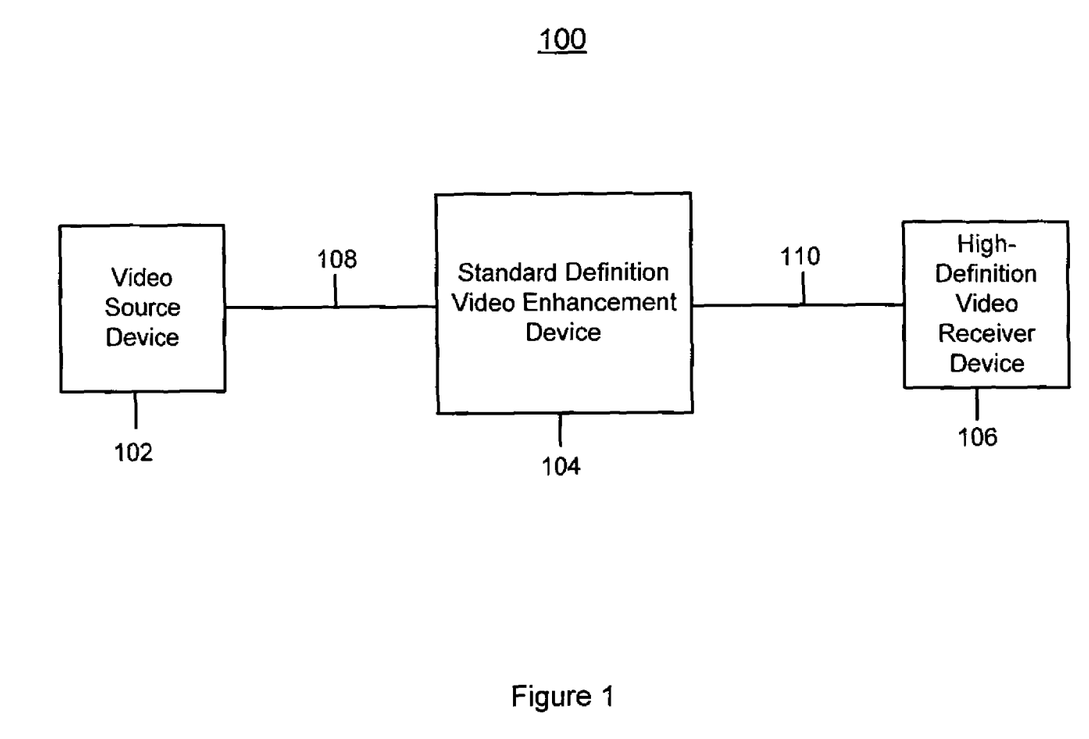
FIG. 1 illustrates a block diagram of a video enhancement system, in accordance with exemplary embodiments.

For instance, video enhancement system 100 from FIG. 1 illustrates a simplified view of a video enhancement system and various elements in the video enhancement system. It is noted that other hardware and software not depicted may be included in video enhancement system 100. It is also noted that video enhancement system 100 illustrates a single instance of a video source device, a standard definition video enhancement device, and/or a high-definition video receiver device. It will be appreciated that one or more instances of each element may be included in a system.

It is further noted that the software described herein may be tangibly embodied in one or more non-transitory physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

In an exemplary embodiment, a video enhancement system may be configured to enhance one or more standard definition (SD) video signals for display on a High Definition television (HDTV) using one or more SD video enhancement devices. A SD video signal may include a video signal that carries six (6) Mb of video content using a 6 MHz frequency range. In various embodiments, one or more SD video enhancement devices may receive one or more SD video signals from one or more video source devices. In various embodiments, one or more SD video enhancement devices may output one or more enhanced SD video signals to one or more high-definition video receiver devices.

FIG. 1 illustrates block diagram of a video enhancement system 100 in accordance with exemplary embodiments. The video enhancement system 100 may include one or more video source devices 102, one or more standard definition video enhancement devices 104, and one or more high-definition video receiver devices 106.

In an exemplary embodiment, the video source device 102 may include software and/or hardware configured to receive and/or generate one or more SD video signals. The video source device 102 may include software and/or hardware configured to communicate one or more SD video signals to the standard definition video enhancement device 104 via data path 108. The video source device 102 may receive one or more SD video signals from a computer device or communications device including, e.g., a personal computer (PC), a workstation, a thin system, a fat system, network appliance, an Internet browser, a server, an SD video signal cable, and/or any other device that is configured to generate one or more SD video signals.

In an exemplary embodiment, the standard definition video enhancement device 104 may include software and/or hardware configured to receive one or more SD video signals from the video source device 102 via data path 108, enhance one or more SD video signals, and/or output one or more enhanced SD video signals to the high-definition video receiver device 106 via data path 110. In various embodiments, the standard definition video enhancement device 104 and/or one or more elements shown in FIG. 1 may be stand-alone devices and/or integrated into any suitable audio-visual electronics, such as, a High Definition television (HDTV), etc. The standard definition video enhancement device 104 is discussed in greater detail below.

In an exemplary embodiment, the high-definition video receiver device 106 may include software and/or hardware configured to receive one or more enhanced SD video signals from the standard definition video enhancement device 104 via data path 110 and/or output (e.g., display) one or more enhanced SD video signals to a display device (not shown). The high-definition video receiver device 106 may include a computer device or a communications device, e.g., a personal computer (PC), a workstation, a thin system, a fat system, network appliance, an Internet browser, a server, a television, a High Definition television (HDTV), a monitor, and/or any other device that may be used to view one or more enhanced SD video signals.

In an exemplary embodiment, one or more data paths disclosed herein may include any device that communicatively couples one or more devices to each other. For example, data path 108 and/or data path 110 may include one or more networks, one or more conductive wires (e.g., copper wires), etc. In an exemplary embodiment, one or more devices and/or elements shown in FIG. 1 may be physically located at a television viewer's premise. In an exemplary embodiment, one or more devices and/or elements shown in FIG. 1 may be physically located at a television technology provider's premise.

The various components of a video enhancement system 100 as shown in FIG. 1 may be further duplicated, combined and/or integrated to support various applications and platforms. Additional elements may also be implemented in the systems described above to support various applications.

Figure 2:
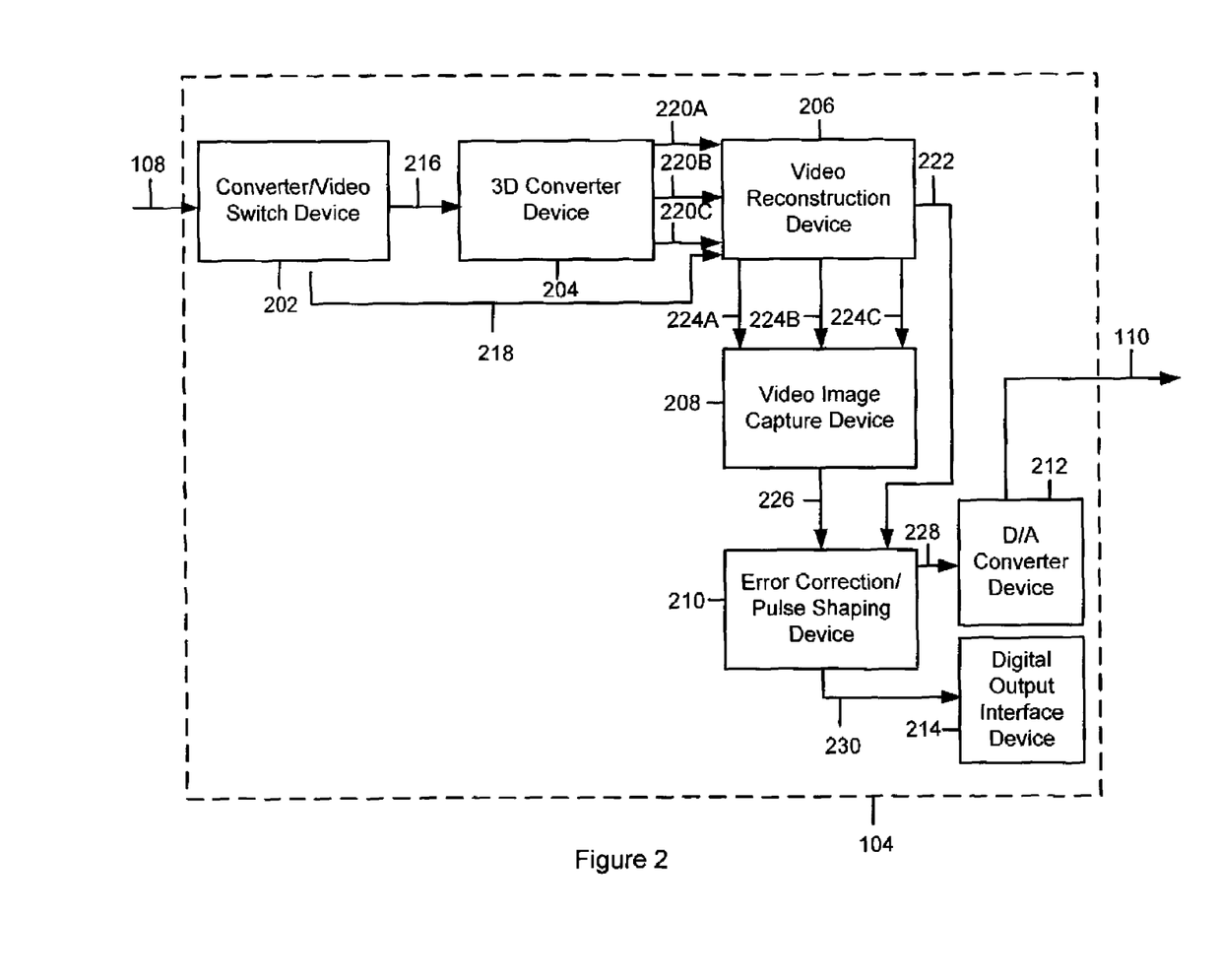
FIG. 2 illustrates a block diagram of a standard definition video enhancement device, in accordance with exemplary embodiments.

FIG. 2 illustrates a block diagram of a standard definition video enhancement device 104, in accordance with an exemplary embodiment. In an exemplary embodiment, the standard definition video enhancement device 104 may include a converter/video switch device 202, a 3D converter device 204, a video reconstruction device 206, a video image capture device 208, an error correction/pulse shaping device 210, a digital-to-analog converter device 212, and a digital output interface device 214. It is noted that the devices 202, 204, 206, 208, 210, 212, and 214 are exemplary. The functions of the devices 202, 204, 206, 208, 210, 212, and 214 may be performed at other devices remote or local to the standard definition video enhancement device 104, and the devices 202, 204, 206, 208, 210, 212, and 214 may be combined and/or separated.

The converter/video switch device 202 may include software and/or hardware configured to receive one or more SD video signals from the video source device 102 via data path 108. In various embodiments, the one or more SD video signals received at the converter/video switch device 202 may be in an analog signal format or a digital signal format. In an exemplary embodiment, one or more SD video signals received at the converter/video switch device 202 may be in analog signal format that includes a 30% Red (R) video signal portion, a 59% Green (G) video signal portion, and/or a 11% Blue (B) video signal portion. In various embodiments, these video signal portions may combine to form a luminance signal and/or a black and white television signal such as those well-known in the art. It should be noted that additional video content used to produce a color image (e.g., color picture) may be transmitted (e.g., modulated) on a sub-carrier signal (e.g., a 3.58 MHz color burst signal) and may be represented using vector mathematics and/or by displaying the sub-carrier signal on a display device (e.g., a vector scope).

The converter/video switch device 202 may include software and/or hardware configured to determine if one or more SD video signals received from the video source device 102 are associated with an analog signal format or a digital signal format. If, for example, one or more SD video signals are associated with the digital signal format, the converter/video switch device 202 may transmit the one or more SD video signals to the video reconstruction device 206 for further processing. In an exemplary embodiment, the video switch portion of the converter/video switch device 202 may allow a television viewer to disconnect the input to the 3D converter device 204 (e.g., bypass the 3D converter device 204) for normal viewing of one or more SD video signals. If, however, one or more SD video signals are associated with the analog signal format, the converter/video switch device 202 may digitize the one or more SD video signals using digitizing techniques that are well-known in the art. In various embodiments, the digitizing functions (e.g., Analog to Digital Conversion) performed on the one or more SD video signals may limit the amount of signal noise (e.g., unwanted portions of the SD video signal) associated with the one or more SD video signals. In various embodiments, the digitizing functions (e.g., Analog to Digital Conversion) performed on the one or more SD video signals may create one or more baseline signals that may be used in one or more smoothing functions (e.g., sampling functions) performed on a re-converted analog representation of the original SD video signals (discussed in further detail below). A baseline signal may include may include a SD video signal that has been filtered using one or more analog-to-digital converters.

In various embodiments, the converter/video switch device 202 may include one or more devices that are well-known in the art for converting analog video signals into digital video signals. For example, the converter/video switch device 202 may include one or more analog-to-digital converters. In various embodiments, the converter/video switch device 202 may include one or more devices that are well-known in the art for connecting and disconnecting video inputs and/or video outputs. For example, the converter/video switch device 202 may include one or more video switches. The converter/video switch device 202 may be communicatively coupled to the 3D converter device 204 and may output (e.g., transmit) one or more digital SD video signals to the 3D converter device 204 via data path 216.

The 3D converter device 204 may include software and/or hardware configured to receive one or more digital SD video signals from the converter/video switch device 202 via data path 216. The 3D converter device 204 may include software and/or hardware configured to re-convert the one or more digital SD video signals into one or more analog representations of the original one or more SD video signals. In various embodiments, the 3D converter device 204 may re-convert the one or more digital SD video signals into one or more analog representations of the original one or more SD video signals using one or more devices that are well-known in the art for converting digital video signals into analog video signals. For example, the 3D converter device 204 may include one or more digital-to-analog converters. While in analog signal form, the 3D converter device 204 may filter the one or more SD video signals by removing signal noise and/or other unwanted signal qualities using one or more filtering devices, such as, low pass filters, high pass filters, band-pass filters, etc.

The 3D converter device 204 may include software and/or hardware configured to fragment (e.g., split) the one or more analog representations of the one or more SD video signals into one or more portions. For example, the 3D converter device 204 may fragment the one or more analog representations of the one or more SD video signals into one or more Red SD video signal portions, one or more Green SD video signal portions, and/or one or more Blue SD video signal portions. In various embodiments, the 3D converter device 204 may fragment the one or more analog representations of the one or more SD video signals into one or more portions using one or more devices that are well-known in the art for fragmenting one or more video signals into one or more portions. For example, the 3D converter device 204 may include one or more digital-to-analog-to-3D converters.

The 3D converter device 204 may include software and/or hardware configured to amplify one or more SD video signals. For example, the 3D converter device 204 may amplify (e.g., increase the voltage) the one or more Red SD video signal portions, the one or more Green SD video signal portions, and/or the one or more Blue SD video signal portions. In various embodiments, the 3D converter device 204 may amplify one or more SD video signals using one or more devices that are well-known in the art for amplifying one or more video signals. The 3D converter device 204 may include one or more voltage amplifiers.

The 3D converter device 204 may include software and/or hardware configured to digitize one or more SD video signals and/or perform one or more smoothing functions on the one or more SD video signals. A smoothing function may include sampling one or more SD video signals such that additional data points (e.g., voltage levels) are added to the one or more SD video signals. The smoothing function may result in one or more SD video signals that are closer in form to and/or representation of the one or more original SD video signals. It should be noted that an increase in the number of data points may result in a closer representation of the one or more original SD video signals and may provide higher quality images at viewing. Accordingly, the 3D converter device 204 may digitize and/or perform one or more smoothing functions on the one or more Red SD video signal portions, the one or more Green SD video signal portions, and/or the one or more Blue SD video signal portions.

The 3D converter device 204 may include software and/or hardware configured to compare one or more smoothed SD video signals to one or more baseline signals. For example, the 3D converter device 204 may compare one or more smoothed SD video signals to one or more baseline signals provided by the converter/video switch device 202 to determine whether the one or more additional data points increase the resolution (e.g., voltage resolution) of the one or more smoothed SD video signals over the resolution of the one or more original SD video signals. For example, the 3D converter device 204 may determine that the resolution of the one or more smoothed SD video signals has been increased over the resolution of the one or more original SD video signals and the 3D converter device 204 may transmit the one or more smoothed SD video signals to the video reconstruction device 206.

The 3D converter device 204 may be communicatively coupled to the video reconstruction device 206 and may output (e.g., transmit) one or more Red SD video signal portions, one or more Green SD video signal portions, and/or one or more Blue SD video signal portions that have been digitized and/or smoothed to the video reconstruction device 206 via data path 220A, 220B, and 220C, respectively. It should be noted that each SD video signal portion (e.g., each Red SD signal portion, each Green SD signal portion, each Blue SD signal portion) may be associated with a higher resolution, a restoration of a full amplitude (e.g., approximately 100% amplitude), and/or a spectral density (e.g., bandwidth) of approximately 6 Megabytes.

The video reconstruction device 206 may include software and/or hardware configured to receive one or more Red SD video signal portions from the 3D converter device 204 via data path 220A, one or more Green SD video signal portions from the 3D converter device 204 via data path 220B, and one or more Blue SD video signal portions from the 3D converter device 204 via data path 220C. The video reconstruction device 206 may include software and/or hardware configured to display (e.g., output) one or more SD video signal portions as one or more analog light signals and/or reconstruct one or more SD video signal portions. For example, the video reconstruction device 206 may include one or more (e.g., three) Digital Light Processors (DLP). The first DLP may receive one or more Red SD video signal portions as input via data path 220A, the second DLP may receive one or more Green SD video signal portions as input via data path 220B, and the third DLP may receive one or more Blue SD video signal portions as input via data path 220C.

In an exemplary embodiment, the first DLP may include software and/or hardware configured to display (e.g., output, reconstruct) the one or more Red SD video signal portions as one or more Red analog light signals. In an exemplary embodiment, the second DLP may include software and/or hardware configured to display (e.g., output, reconstruct) the one or more Green SD video signal portions as one or more Green analog light signals. In an exemplary embodiment, the third DLP may include software and/or hardware configured to display (e.g., output, reconstruct) the one or more Blue SD video signal portions as one or more Blue analog light signals.

In an exemplary embodiment, reconstructing one or more SD video signal portions may include one or more DLPs receiving the one or more SD video signal portions and displaying the one or more SD video signal portions as one or more black and white images. In various embodiments, one or more tri-color light emitting diodes (LEDs) may then be used as a color wheel to add one or more chromatic effects to the one or more black and white images. In various embodiments, one or more SD video signals (e.g., digital pulses) may be used to synchronize the tri-color LED array for enhanced color creation. It should be noted that a luminance signal associated with the one or more SD video signal portions may be used to control one or more mirrors associated with each DLP. In various embodiments, one or more luminance signals in digital form may be used as a control signal for one or more DLP chip mirrors. Accordingly, each DLP may function and/or operate as a light transmitter.

The video reconstruction device 206 may be optically coupled to the video image capture device 208 and may output (e.g., transmit) one or more Red analog light signals to the video image capture device 208 via data path 224A, one or more Green analog light signals to the video image capture device 208 via data path 224B, and/or one or more Blue analog light signals to the video image capture device 208 via data path 224C. It should be noted that the video reconstruction device 206 may be optically coupled to the video image capture device 208 using one or more optical media that provide for very little (e.g., negligible) attenuation to the one or more optical images (e.g., one or more black and white images). Very little attenuation may include the amount of attenuation that causes a noticeable degradation of image quality to a television viewer. In various embodiments, 1.5 dB may be the highest acceptable amount of attenuation associated with the standard definition video enhancement device 104. In various embodiments, the video reconstruction device 206 may output (e.g., transmit) one or more black and white images to the video image capture device 208 via data path 224.

The video image capture device 208 may include software and/or hardware configured to receive the one or more Red analog light signals via data path 224A, the one or more Green analog light signals via data path 224B, and the one or more Blue analog light signals via data path 224C. In various embodiments, the video image capture device 208 may be configured to digitize one or more Red analog light signals, one or more Green analog light signals, and one or more Blue analog light signals. In various embodiments, the video image capture device 208 may be configured to produce one or more enhanced SD video signals using one or more portions of the one or more digitized signals. In various embodiments, the video image capture device 208 may use one or more Fresnel arrays to enhance one or more black and white images.

In various embodiments, the video image capture device 208 may include one or more devices well-known in the art for converting analog light signals into digital signals and producing enhanced SD video signals. For example, the video image capture device 208 may include one or more charged capacitor devices (CCD). In an exemplary embodiment, the video image capture device 208 may be communicatively coupled to an error correction/pulse shaping device 210 and may output (e.g., transmit) one or more enhanced SD video signals to the error correction/pulse shaping device 210 via data path 226.

The error correction/pulse shaping device 210 may include software and/or hardware configured to receive one or more enhanced SD video signals via data path 226 and/or one or more samples of SD video signals from the video reconstruction device 206 via data path 222. In various embodiments, the error correction/pulse shaping device 210 may be configured to digitally reconstruct one or more enhanced SD video signals by comparing the one or more samples of SD video signals from the video reconstruction device 206 to the inputted one or more enhanced SD video signals. In an exemplary embodiment, the error correction/pulse shaping device 210 may shape one or more enhanced SD video signals to match the input characteristics of the one or more samples of SD video signals, based on the comparison, while maintaining the enhanced quality of the one or more enhanced SD video signals. In various embodiments, the error correction/pulse shaping device 210 may perform one or more error correction methods using one or more error correction formats (e.g., Schmitt trigger error correction formats or Reed Solomon error correction formats). In various embodiments, the error correction/pulse shaping device 210 may shape the pulse of one or more enhanced SD video signals (e.g., perform one or more pulse shaping methods) using one or more pulse shaping devices to remove low frequency response error and/or high frequency response error.

In an exemplary embodiment, the error correction/pulse shaping device 210 may be communicatively coupled to a digital-to-analog converter device 212 and may output (e.g., transmit) one or more enhanced SD video signals to the digital-to-analog converter device 212 via data path 228. In an exemplary embodiment, the error correction/pulse shaping device 210 may be communicatively coupled to a digital output interface device 214 and may output (e.g., transmit) one or more enhanced SD video signals to the digital output interface device 214 via data path 230.

The digital-to-analog converter device 212 may include software and/or hardware configured to receive one or more enhanced SD video signals from the error correction/pulse shaping device 210 via data path 228. In various embodiments, the digital-to-analog converter device 212 may be configured to convert the one or more enhanced digital SD video signals into one or more enhanced analog SD video signals. In various embodiments, the digital-to-analog converter device 212 may convert the one or more enhanced digital SD video signals into one or more enhanced analog SD video signals using one or more devices that are well-known in the art for converting digital video signals into analog video signals. For example, the digital-to-analog converter device 212 may include one or more digital-to-analog converters. In various embodiments, the digital-to-analog converter device 212 may be communicatively coupled to a high-definition video receiver device 106 and may output (e.g., display, transmit) one or more enhanced analog SD video signals to the high-definition video receiver device 106 via data path 110.

The digital output interface device 214 may include software and/or hardware configured to receive one or more enhanced SD video signals from the error correction/pulse shaping device 210 via data path 230. In various embodiments, the digital output interface device 214 may be configured to support the output of the one or more enhanced digital SD video signals using one or more digital video output interfaces. For example, the digital output interface device 214 may be configured to support the output of the one or more enhanced digital SD video signals using a coaxial video output interface, a High-Definition Multimedia Interface (HDMI), an IEEE1384 digital video output interface, and/or any other digital video output interface.

Figure 3A:
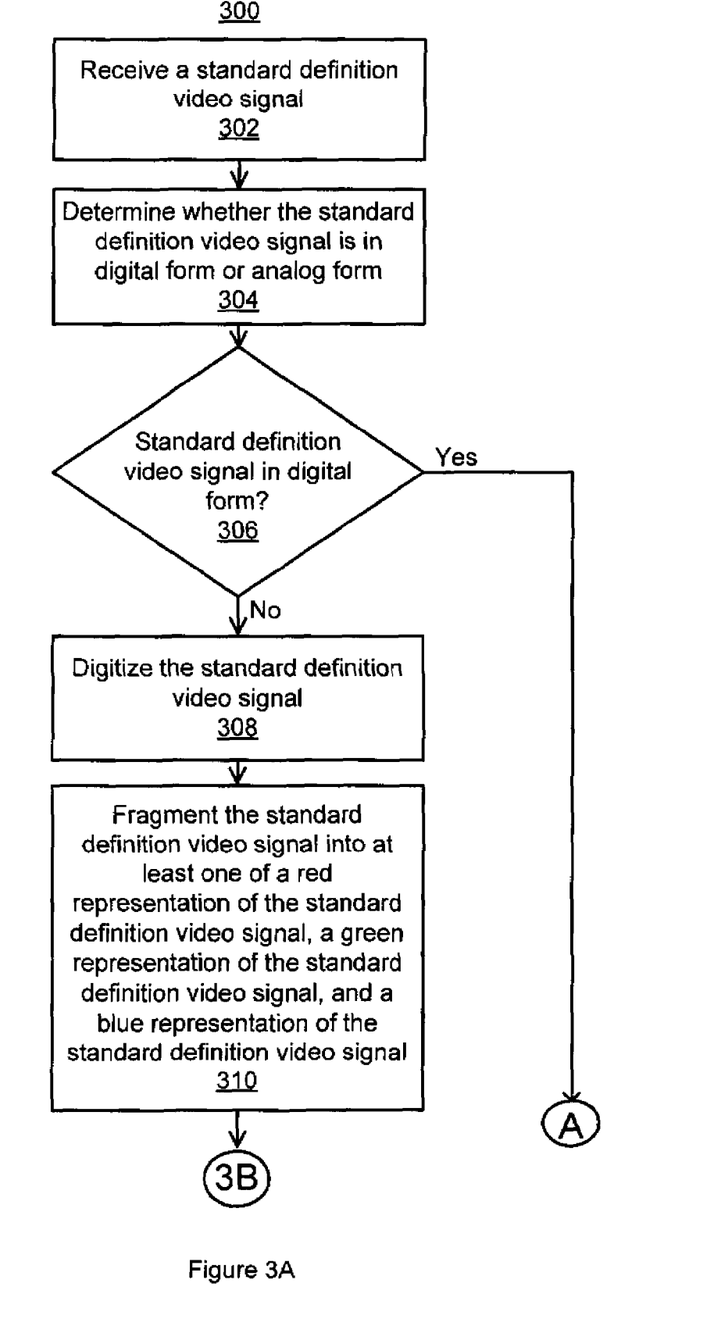
FIG. 3A illustrates a flowchart of a method for enhancing standard definition video signals for display on a high definition television, in accordance with exemplary embodiments.

FIG. 3A illustrates a flowchart of a method 300 for enhancing standard definition video signals for display on a high definition television, in accordance with exemplary embodiments. This exemplary method is provided by way of example, as there are a variety of ways to carry out methods disclosed herein. The method 300 shown in FIG. 3A can be executed or otherwise performed by one or a combination of various systems and/or devices. The method 300 is described below as carried out by the standard definition enhancement device 104 shown in FIG. 1 by way of example, and various devices of the standard definition enhancement device 104 are referenced in explaining the example method of FIG. 3A. Each block shown in FIG. 3A represents one or more processes, methods, or subroutines carried in the exemplary method 300. Referring to FIG. 3A, the exemplary method 300 may begin at block 302.

In block 302, the method 300 may include receiving a SD video signal. In an exemplary embodiment, the standard definition enhancement device 104 may receive a SD video signal from the video source device 102 via data path 108. The method 300 may continue to block 304.

In block 304, the method 300 may include determining whether the SD video signal is in a digital form or an analog form. In an exemplary embodiment, the standard definition enhancement device 104 may determine whether the SD video signal is in a digital form or an analog form using a converter/video switch device 202. The method 300 may continue to block 306.

In block 306, if, for example, the converter/video switch device 202 determines that the SD video signal is in digital form, the method 300 may continue to block 312. If, however, the converter/video switch device 202 determines that the SD video signal is in analog form, the method 300 may digitize the SD video signal in block 308. The method 300 may continue to block 308.

In block 308, the method 300 may include digitizing the SD video signal. In an exemplary embodiment, the standard definition enhancement device 104 may digitize the SD video signal using one or more analog-to-digital converts of the converter/video switch device 202. The method 300 may continue to block 310.

In block 310, the method 300 may include fragmenting the SD video signal into at least one of a Red representation of the SD video signal, a Green representation of the SD video signal, and a Blue representation of the SD video signal. In an exemplary embodiment, the standard definition enhancement device 104 may fragment the SD video signal into at least one of a Red representation of the SD video signal, a Green representation of the SD video signal, and a Blue representation of the SD video signal using one or more 3D converter devices 204. The method 300 may continue to the 3B portion of FIG. 3B.

Figure 3B:
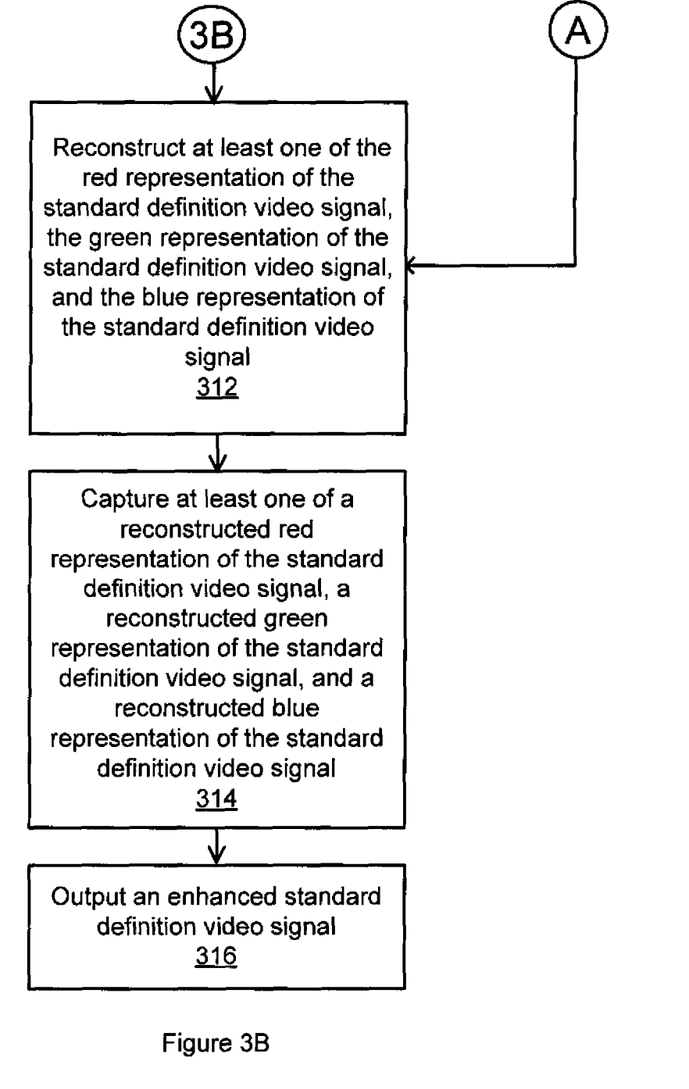
FIG. 3B illustrates a flowchart continuing the method for enhancing standard definition video signals for display on a high definition television described in FIG. 3A, in accordance with exemplary embodiments.

FIG. 3B illustrates a flowchart continuing the method 300 for enhancing standard definition video signals for display on a high definition television described in FIG. 3A, in accordance with exemplary embodiments. The method 300 shown in FIG. 3B may be executed or otherwise performed by one or a combination of various systems and/or devices. The method 300 is described below as carried out by the standard definition enhancement device 104 shown in FIG. 1 by way of example, and various devices of the standard definition enhancement device 104 are referenced in explaining the example method of FIG. 3B. Each block shown in FIG. 3B represents one or more processes, methods, or subroutines carried in the exemplary method 300. Referring to FIG. 3B, the exemplary method 300 may begin at block 312.

In block 312, the method 300 may include reconstructing at least one of the Red representation of the SD video signal, the Green representation of the SD video signal, and the Blue representation of the SD video signal. In an exemplary embodiment, the standard definition enhancement device 104 may reconstruct at least one of the Red representation of the SD video signal, the Green representation of the SD video signal, and the Blue representation of the SD video signal using one or more video reconstruction devices 206. The method 300 may continue to block 314.

In block 314, the method 300 may include capturing at least one of a reconstructed Red representation of the SD video signal, a reconstructed Green representation of the SD video signal, and a reconstructed Blue representation of the SD video signal. In an exemplary embodiment, the standard definition enhancement device 104 may capture at least one of the reconstructed Red representation of the SD video signal, the reconstructed Green representation of the SD video signal, and the reconstructed Blue representation of the SD video signal using one or more video image capture devices 208. The method 300 may continue to block 316.

In block 316, the method 300 may include outputting an enhanced SD video signal. In an exemplary embodiment, the standard definition enhancement device 104 may output the enhanced SD video signal to one or more high-definition video receiver devices 106 and/or one or more digital output interface devices 214. The method 300 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving, from a video source device, an original standard definition video signal;
fragmenting the standard definition video signal into at least one of a red representation of the standard definition video signal, a green representation of the standard definition video signal, and a blue representation of the standard definition video signal using one or more 3D converter devices;
reconstructing at least one of the red representation of the standard definition video signal, the green representation of the standard definition video signal, and the blue representation of the standard definition video signal using one or more video reconstruction devices comprising one or more Digital Light Processors (DLP) wherein the one or more DLPs each correspond to the at least one red representation, the green representation, and the blue representation of the standard definition video signal;
capturing at least one of a reconstructed red representation of the standard definition video signal, a reconstructed green representation of the standard definition video signal, and a reconstructed blue representation of the standard definition video signal using one or more video image capture devices; and
outputting, to a high-definition video receiver device, an enhanced standard definition video signal.

2. The method of claim 1, further comprising determining whether the standard definition video signal is in an analog signal form using one or more converter/video switch devices.

3. The method of claim 2, further comprising digitizing the standard definition video signal based on the determination using the one or more converter/video switch devices.

4. The method of claim 1, further comprising reconverting the standard definition video signal into an analog signal form of the original standard definition video signal using the one or more 3D converter devices.

5. The method of claim 1, further comprising amplifying at least one of the red representation of the standard definition video signal, the green representation of the standard definition video signal, and the blue representation of the standard definition video signal using the one or more 3D converter devices.

6. The method of claim 1, further comprising sampling at least one of the red representation of the standard definition video signal, the green representation of the standard definition video signal, and the blue representation of the standard definition video signal using the one or more 3D converter devices.

7. The method of claim 1, wherein reconstructing at least one of the red representation of the standard definition video signal, the green representation of the standard definition video signal, and the blue representation of the standard definition video signal further comprises transmitting at least one of the red representation of the standard definition video signal, the green representation of the standard definition video signal, and the blue representation of the standard definition video signal to the one or more video image capture devices as one or more images.

8. The method of claim 1, wherein capturing at least one of a reconstructed red representation of the standard definition video signal, a reconstructed green representation of the standard definition video signal, and a reconstructed blue representation of the standard definition video signal further comprises digitizing at least one of the reconstructed red representation of the standard definition video signal, the reconstructed green representation of the standard definition video signal, and the reconstructed blue representation of the standard definition video signal.

9. The method of claim 1, further comprising performing one or more error correction methods on the enhanced standard definition video signal prior to outputting the enhanced standard definition video signal to the high-definition video receiver device.

10. The method of claim 1, further comprising performing one or more pulse shaping methods on the enhanced standard definition video signal prior to outputting the enhanced standard definition video signal to the high-definition video receiver device.

11. A non-transitory computer readable media comprising code to perform the acts of the method of claim 1.

12. A system, comprising:
a standard definition video enhancement device, comprising at least a computer processor and computer memory, operable to store computer instructions, coupled to a video source device and a high-definition video receiver device and the standard definition video enhancement device is configured to:
receive, from the video source device, an original standard definition video signal;
fragment the standard definition video signal into at least one of a red representation of the standard definition video signal, a green representation of the standard definition video signal, and a blue representation of the standard definition video signal using one or more 3D converter devices;
reconstruct at least one of the red representation of the standard definition video signal, the green representation of the standard definition video signal, and the blue representation of the standard definition video signal using one or more video reconstruction devices comprising one or more Digital Light Processors (DLP) wherein the one or more DLPs each correspond to the at least one red representation, the green representation, and the blue representation of the standard definition video signal;
capture at least one of a reconstructed red representation of the standard definition video signal, a reconstructed green representation of the standard definition video signal, and a reconstructed blue representation of the standard definition video signal using one or more video image capture devices; and
output, to the high-definition video receiver device, an enhanced standard definition video signal.

13. The system of claim 12, wherein the standard definition video enhancement device is further configured to determine whether the standard definition video signal is in an analog signal form using one or more converter/video switch devices.

14. The system of claim 13, wherein the standard definition video enhancement device is further configured to digitize the standard definition video signal based on the determination using the one or more converter/video switch devices.

15. The system of claim 12, wherein the standard definition video enhancement device is further configured to reconvert the standard definition video signal into an analog signal form of the original standard definition video signal using the one or more 3D converter.

16. The system of claim 12, wherein the standard definition video enhancement device is further configured to amplify at least one of the red representation of the standard definition video signal, the green representation of the standard definition video signal, and the blue representation of the standard definition video signal using the one or more 3D converter devices.

17. The system of claim 12, wherein the standard definition video enhancement device is further configured to sample at least one of the red representation of the standard definition video signal, the green representation of the standard definition video signal, and the blue representation of the standard definition video signal using the one or more 3D converter devices.

18. The system of claim 12, wherein the standard definition video enhancement device is further configured to perform one or more error correction methods on the enhanced standard definition video signal prior to outputting the enhanced standard definition video signal to the high-definition video receiver device.

19. The system of claim 12, wherein the standard definition video enhancement device is further configured to perform one or more pulse shaping methods on the enhanced standard definition video signal prior to outputting the enhanced standard definition video signal to the high-definition video receiver device.

20. A method, comprising:
receiving, from a video source device, an original standard definition video signal;
fragmenting the standard definition video signal into at least one of a red representation of the standard definition video signal, a green representation of the standard definition video signal, and a blue representation of the standard definition video signal using one or more 3D converter devices;
reconstructing at least one of the red representation of the standard definition video signal, the green representation of the standard definition video signal, and the blue representation of the standard definition video signal using one or more video reconstruction devices comprising one or more Digital Light Processors (DLP) wherein the one or more DLPs each correspond to the at least one red representation, the green representation, and the blue representation of the standard definition video signal;
capturing at least one of a reconstructed red representation of the standard definition video signal, a reconstructed green representation of the standard definition video signal, and a reconstructed blue representation of the standard definition video signal using one or more video image capture devices, wherein the one or more video reconstruction devices comprises one or more Digital Light Processors (DLP);
performing at least one of error correction methods and pulse shaping methods on an enhanced standard definition video signal; and
outputting, to a high-definition video receiver device, the enhanced standard definition video signal.

* * * * *